US008386803B2

(12) United States Patent
Farrugia et al.

(10) Patent No.: US 8,386,803 B2
(45) Date of Patent: Feb. 26, 2013

(54) SYSTEM AND METHOD FOR DATA OBFUSCATION BASED ON DISCRETE LOGARITHM PROPERTIES

(75) Inventors: Augustin J. Farrugia, Cupertino, CA (US); Benoit Chevallier-Mames, Paris (FR); Mathieu Ciet, Paris (FR); Jon McLachlan, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 646 days.

(21) Appl. No.: 12/621,153

(22) Filed: Nov. 18, 2009

(65) Prior Publication Data

US 2011/0116624 A1    May 19, 2011

(51) Int. Cl.
- G06F 11/30 (2006.01)
- G06F 12/14 (2006.01)
- H04K 1/00 (2006.01)
- H04L 9/00 (2006.01)
- H04L 9/28 (2006.01)

(52) U.S. Cl. .......................................... 713/190; 380/28
(58) Field of Classification Search .......... 713/189–190; 380/28
See application file for complete search history.

(56) References Cited

U.S. PATENT DOCUMENTS

| 7,620,987 B2* | 11/2009 | Shelest et al. ............. 726/22 |
| 2004/0003278 A1* | 1/2004 | Chen et al. ............... 713/200 |
| 2005/0002532 A1 | 1/2005 | Zhou et al. |
| 2005/0166191 A1* | 7/2005 | Kandanchatha et al. ..... 717/137 |
| 2009/0094464 A1 | 4/2009 | Futa et al. |

OTHER PUBLICATIONS

Ertaul et al., Novel Obfuscation Algorithm for Software Security, 2005.*
Levent Ertaul and Suma Venkatesh, "Novel Obfuscation Algorithms for Software Security," Proceedings of the 2005 International Conference on Software Engineering Research and Practice, SERP'05, Las Vegas, Jun. 2005.
M. Barbosa, A. Moss and D. Page "Compiler Assisted Elliptic Curve Cryptography," On the Move to Meaningful Internet Systems 2007: CoopIS, DOA, ODBASE, GADA, and IS, vol. 4804/2009, pp. 1785-1802, Springer Berlin / Heidelberg.

* cited by examiner

*Primary Examiner* — Philip Chea
*Assistant Examiner* — Trong Nguyen
(74) *Attorney, Agent, or Firm* — Novak Druce Connolly Bove + Quigg LLP

(57) ABSTRACT

Disclosed herein are systems, computer-implemented methods, and computer-readable storage media for obfuscating data based on a discrete logarithm. A system practicing the method identifies a clear value in source code, replaces the clear value in the source code with a transformed value based on the clear value and a discrete logarithm, and updates portions of the source code that refer to the clear value such that interactions with the transformed value provide a same result as interactions with the clear value. This discrete logarithm approach can be implemented in three variations. The first variation obfuscates some or all of the clear values in loops. The second variation obfuscates data in a process. The third variation obfuscates data pointers, including tables and arrays. The third variation also preserves the ability to use pointer arithmetic.

20 Claims, 7 Drawing Sheets

FIG. 5

```
unsigned long T1[256] = {
05, 07, 0b, 11, 19, 23, 2f, 3d, 4d, 5f, 73, 89, a1, bb, 7d, f5,
15, 37, 5b, 81, a9, d3, ff, 2d, 5d, 8f, c3, f9, 31, 6b, a7, e5,
25, 67, ab, f1, 39, 83, cf, 1d, 6d, bf, 13, 69, c1, 1b, 77, d5,
35, 97, fb, 61, c9, 33, 9f, 0d, 7d, ef, 63, d9, 51, cb, 47, c5,
45, c7, 4b, d1, 59, e3, 6f, fd, 8d, 1f, b3, 49, e1, 7b, 17, b5,
55, f7  9b, 41, e9, 93, 3f, ed, 9d, 4f, 03, b9, 71, 2b, e7, a5,
65, 27, eb, b1, 79, 43, 0f, dd, ad, 7f, 53, 29, 01, db, b7, 95,
75, 57, 3b, 21, 09, f3, df, cd, bd, af, a3, 99, 91, 8b, 87, 85,
85, 87, 8b, 91, 99, a3, af, bd, cd, df, f3, 09, 21, 3b, 57, 75,
95, b7  db, 01, 29, 53, 7f, ad, dd, 0f, 43, 79, b1, eb, 27, 65,
a5, e7, 2b, 71, b9, 03, 4f, 9d, ed, 3f, 93, e9, 41, 9b, f7, 55,
b5, 17, 7b, e1, 49, b3, 1f, 8d, fd, 6f, e3, 59, d1, 4b, c7, 45,
c5, 47, cb, 51, d9, 63, ef, 7d, 0d, 9f, 33, c9, 61, fb, 97, 35,
d5, 77, 1b, c1, 69, 13, bf, 6d, 1d, cf, 83, 39, f1, ab, 67, 25,
e5, a7, 6b, 31, f9, c3, 8f, 5d, 2d, ff, d3, a9, 81, 5b, 37, 15,
f5, d7, bb, a1, 89, 73, 5f, 4d, 3d, 2f, 23, 19, 11, 0b, 07, 05,
};
       unsigned long i for (i = 10; i != 150; i += 2) {
           access or manipulate data at T1[i]
       }
```

FIG. 6

```
unsigned long T2[4079] = {
5e, c4, fc, 82, 69, bd, cb, ad, 76, 27, 23, 64, c0, d3, 5d, 8b,
04, a6, 6b, ac, fb, aa, e5, c5, 02, 49, fa, 50, be, 64, cf, dd,
62, 77, 17, 0d, 95, 97, 8c, 34, 28, 0a, 56, 55, d7, 41, 94, 50,
11, 6f, 0b, 6f, 2b, 18, 15, 8d, 77, 44, 59, 4a, 79, 68, f6, e3,
03, 1b, ed, 13, 8f, dc, d7, c1, 77, b6, ed, 2a, 06, 9d, 26, 15,
a5, ab, 7e, 0a, ba, a3, 45, 69, 08, 68, e7, 4f, 0b, fd, b0, 83,
  ⋮
8c, f8, ff, ef, c7, 10, 25, f1, 26, 0c, a0, 27, cb, 30, dc, f7,
9d, 42, 6b, 62, 4a, 48, cc, da, f4, f2, 75, 72, e9, 73, 46, 1a,
9d, d2, 90, 16, 4f, 15, c2, 63, 11, 05, 2b, 56, 7c, e6, d4, 53,
a3, 32, 0d, 80, 68, 11, 3a, e1, 5c, 5b, bb, 07, 70, 2c, bf, d4,
59, 6d, ff, db, a2, d0, 14, 23, 76, 45, 58, b7, c0, 5f, 84,
};
    unsigned long gi;

for (gi = 4029; gi != 3100; gi = ModularMult (gi, 2733, 4079)){
    access or manipulate data at T2[gi]
    {
```

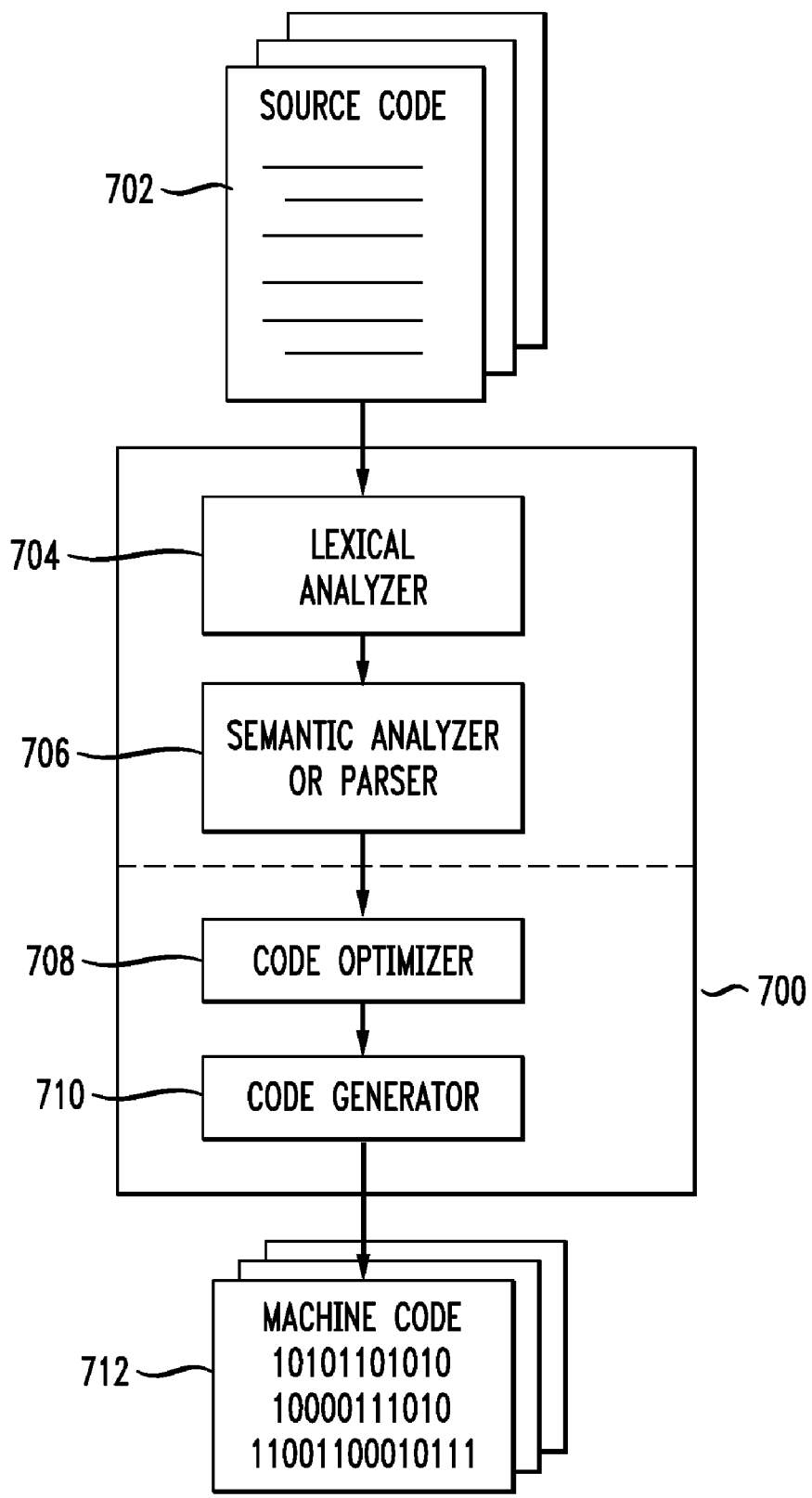

SYSTEM AND METHOD FOR DATA OBFUSCATION BASED ON DISCRETE LOGARITHM PROPERTIES

BACKGROUND

1. Technical Field

The present disclosure relates to code obfuscation and more specifically to data transforms based on discrete logarithm properties.

2. Introduction

Software publishers often attempt to restrict access to portions of compiled software executables to thwart reverse engineering attempts while still allowing the executables to function properly. Reverse engineering is the practice of dissecting and/or analyzing software to understand how it works. On certain systems, reverse engineering can retrieve information stored within software such as information related to cryptographic keys or copy protection schemes. Reverse engineers can even tamper with the software itself or call specific portions of the software for their own unauthorized purposes.

In the field of security of open platforms, data obfuscation is one way to protect portions of code. Indeed, some designers of such platforms have an obligation to protect keys, which processes are running, etc. On the other side, attackers try to gain information that allows copies of the software to be made, or in other cases to extract sensitive information such as keys used to protect content.

Obfuscation is one of many approaches to "code protection" to protect running code against this kind of attack. In this domain, data masking is one approach to code protection, but for this approach to function properly, the data, once masked, should never appear in clear form in the code.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, computer-implemented methods, and computer-readable storage media for obfuscating data based on discrete logarithm properties. A system practicing the method identifies a clear value in source code, replaces the clear value in the source code with a transformed value based on the clear value and a discrete logarithm, and updates portions of the source code that refer to the clear value such that interactions with the transformed value provide a same result as interactions with the clear value. This discrete logarithm approach can be implemented in three variations. The first variation obfuscates some or all of the clear values in loops and is explained in two parts. The second variation obfuscates data in a process. The third variation obfuscates data pointers, including tables and arrays. The third variation also preserves the ability of using pointer arithmetic.

In the first variation for masking a loop, the clear value is part of a loop having an initializer statement which initializes a value J to a value J0, a loop-test statement comparing J to a maximum value JMAX, and a counting expression statement which increments J by a value S, wherein a body of the for loop references indices in a table T1. One example of comparing J to JMAX is J!=JMAX. Other examples also apply, such as J<JMAX, J>JMAX, etc. The system further generates a random value N, generates a random value G with a certain multiplicative order in $Z_N^*$ (details of this are provided below in the detailed description), and generates a random value A. The system then calculates a value GA as follows: $G^A$ modulo N, calculates a value GM as follows: $GA*G^{JMAX}$ modulo N, calculates a value GJ0 as follows: $GA*G^{J0}$ modulo N, and calculates a value GS as follows: $G^S$ modulo N. The system then generates a new table T2 based on table T1 and values GA, GM, GJ0, GS, J0, JMAX, and S, and replaces the initializer statement in the loop J=J0 with G=GJ0, replaces the exemplary loop test statement J!=JMAX with G!=GM, replaces the counting expression statement J+=S with G=G*GS modulo N, and replaces the table T1 with the new table T2.

In the second variation for masking data in a process, the clear value is a set of independent data. The system generates a random odd value K, generates a random value X that is greater than 10, generates a random value N as follows: $K*2^X$, and generates a value G whose order is n modulo $2^X$. Then the system transforms a byte A in the set of independent data to a larger size transformed value A2 as follows: $A2=G^A$ modulo N.

In the third variation for masking pointers, the clear value is a pointer or set of pointers (logical pointers) and the transformed value is a transformed pointer or a set of transformed pointers (physical pointers). The logical pointers can be sorted and the physical pointers can be unsorted.

In one aspect, the principles disclosed herein apply to a compiler which generates code according to the discrete logarithm obfuscation. In another aspect, the principles herein apply to a computing device executing code obfuscated based on the discrete logarithm function. Other applications and combinations of the principles disclosed herein also exist.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 5 illustrates a sample clear table and loop to access elements in the clear table;

FIG. 6 illustrates a sample transformed table and loop to access elements in the transformed table; and FIG. 7 illustrates a block diagram of an exemplary compiler.

DETAILED DESCRIPTION

This disclosure is directed to a new type of data obfuscation based on modular exponentiation which is a strong approach because it is difficult to compute the corresponding discrete logarithm. Three distinct variations of the data transform (DT) based on the discrete logarithm (DL) approach (DT-DL for short) exist. The first variation masks loops and is explained in two parts. The second variation masks data in a process. The third variation masks data pointers. In some programming languages and situations, pointers and arrays are interchangeable and the principles disclosed herein apply equally to pointers as to arrays.

Throughout this disclosure, $X^*$ (or X star) is a DT-DL transformed value of X. $X^+$ (or X plus) is an additive DT (ADD-DT) transformed value of X. $X^{\&}$ is an affine DT (AFF-DT) transformed value. The approach outlined herein is based upon the discrete logarithm problem (DLP), which is used in cryptography and known to be computationally hard. If a data set is small, DLP is relatively easy to solve. However, the DT is still too complex for a non-mathematical attacker. Without the details of the DT, attackers have an even harder task. In all cases, this DT is certainly harder to reverse and understand than classically used methods. At a high level, one part of this disclosure is transforming a "clear" or unobfuscated value A into a "transformed" or obfuscated value $A^*$ by calculating $A^*=G^A$. Under certain conditions, this function is reversible, which means that $A^*$ can easily be converted back to A.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
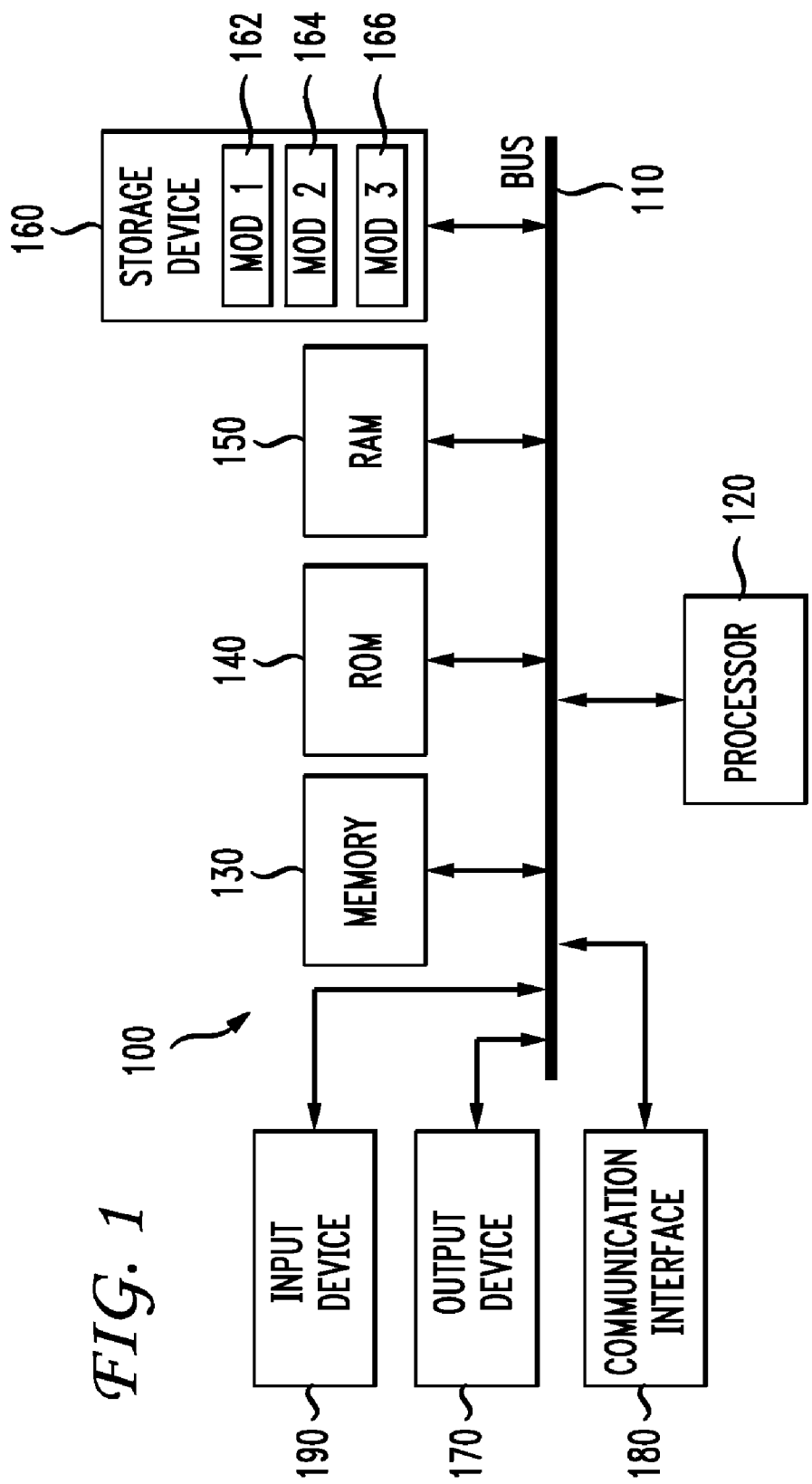
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. These and other modules can be configured to control the processor 120 to perform various actions. Other system memory 130 may be available for use as well. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a tangible and/or intangible computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. The input device 190 may be used by the presenter to indicate the beginning of a speech search query. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Generally speaking, such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
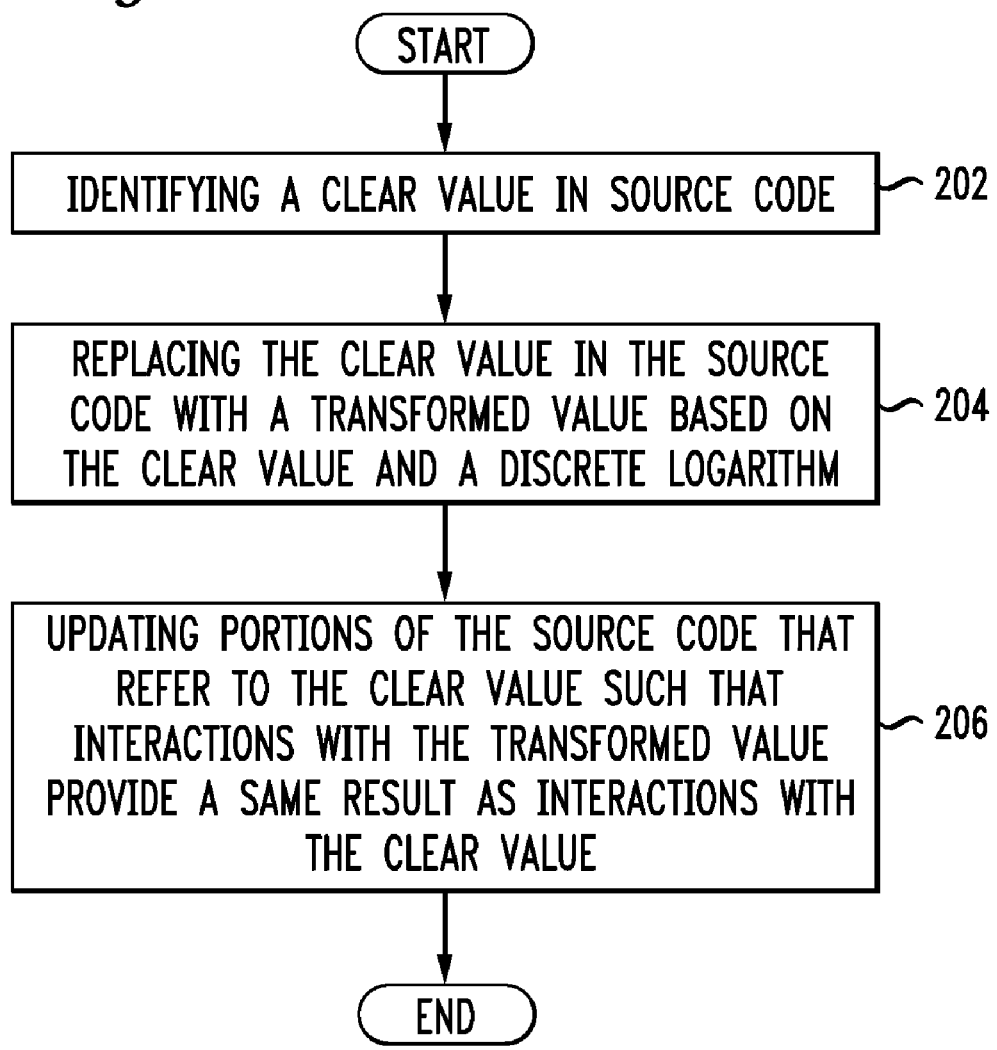
FIG. 2 illustrates an example method embodiment.

Having disclosed some basic system components, the disclosure now turns to the exemplary method embodiment shown in FIG. 2. For the sake of clarity, the method is discussed in terms of an exemplary system 100 such as is shown in FIG. 1 configured to practice the method. The system 100 identifies a clear value in source code (202). The system replaces the clear value in the source code with a transformed value based on the clear value and a discrete logarithm (204). The system 100 updates portions of the source code that refer to the clear value such that interactions with the transformed value provide a same result as interactions with the clear value (206).

Figure 3:
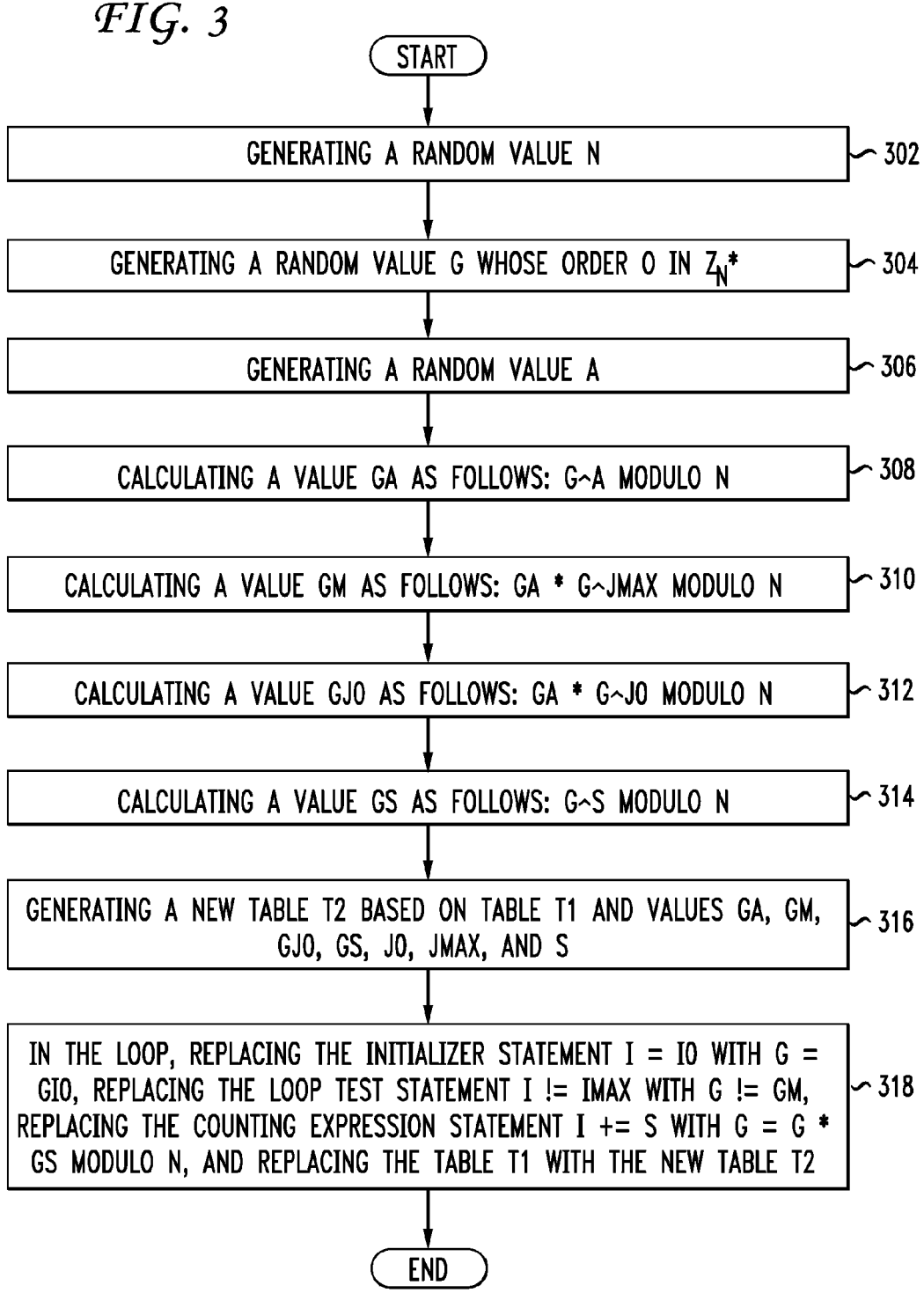
FIG. 3 illustrates an example method embodiment for masking a loop.

FIG. 3 illustrates an example method embodiment of the first variation for masking loops. While the example is discussed in terms of a "for loop," the same principles apply equally to other types of loops, such as while, do-while, and for-each loops. Some while loops can also be transformed into computationally equivalent for loops. Consider the following sample loop:

```
for (J = J0; J != JMAX; J += S)
{
    access and/or modify table T1 with J
}
```

In order to obfuscate this loop operation from attackers, the system 100 can hide J, J0, S, and/or JMAX. In this example, the symbol += represents a compound operation which increments a variable by a given value. For example, J+=S is equivalent to J=J+S. While these examples illustrate incrementing a variable, most loops can be rewritten using a decrement operation. In the case of this sample loop, the system 100 uses the discrete logarithm function, which is the inverse of the exponentiation function, to obfuscate all or part of the loop. $Y=G^X$ modulo P denotes the exponentiation of G to the power X modulo P (modulo is an operator that returns the remainder of a division of one number by another number). Various restrictions on N for invertibility and bijection purposes are described below. If $Y=G^X$ modulo P, then by definition the discrete logarithm of Y in base G modulo P is X. More precisely, one main X exists in [0,Q[ where Q is the order of G, but any X+R·Q for a random R is also a discrete logarithm of Y, but not in the range [0,Q[, however. The number P can be prime or not prime. The phrase "the order of" is defined as follows: Let a∈$Z_n$*. The order of a, denoted ord(a), is the least positive integer t such that $a^t \equiv 1 \pmod{n}$.

In one example, a code snippet refers to a table or array T1, as in the for loop described above, and references elements of the table by T1[J] for the J-th element of T1. In order to transform the sample for loop above, a system 100 configured to practice the method first generates a random value N (302). The system 100 generates a random value G whose order is O in $Z_n$* (304). The system generates a random value A (306). The system 100 calculates a value GA as follows: $G^A$ modulo N (308). The system 100 calculates a value GM as follows: $GA*G^{JMAX}$ modulo N (310). The system 100 calculates a value GJ0 as follows: $GA*G^{J0}$ modulo N (312). The system 100 calculates a value GS as follows: $G^S$ modulo N (314). The system 100 generates a new table T2 based on table T1 and values GA, GM, GJ0, GS, J0, JMAX, and S (316). The system 100, in the loop, replaces the initializer statement J=J0 with G=GJ0, replaces the loop test statement J!=JMAX with G!=GM, replaces the counting expression statement J+=S with G=G*GS modulo N, and replaces the table T1 with the new table T2(318).

A pseudocode example of the process outlined above is provided below:

```
Take a random N
Take a random G, of order O in Z_n*
Take a random A
Compute GA = G^A modulo N
Compute GM = GA * G^JMAX modulo N
Compute GJ0 = GA * G^J0 modulo N
Compute GS = G^S modulo N
```

And replace the loop as follows:

```
for (G = GJ0; G != GM; G = G * GS modulo N)
{
    Modify or use transformed table T2 [G]
}
```

In this example, JMAX−J0 must be less than O. One issue is that the original table T1, which can be larger than or equal to JMAX depending on the scenario, must be replaced by a larger transformed table T2 of size N. The transformed table T2 includes not only the transformed information of T1, but also includes unused slots, space, or words. The system 100 can insert random data in the unused spaces to confuse an attacker, or the system 100 can insert other information used by other processes. The amount of space that goes unused is not exceedingly large due to the granularity of primes. In order to waste as little space as possible, the system 100 can implement an optimal approach of selecting N as the smallest possible prime number larger than or equal to the size of table T1. In this case, O=N−1, and the transformed table wastes or does not use only a small amount of space. The system can select prime integers N from a table of relatively small prime numbers.

In this case, security is relatively good, since none of J, S, JMAX, and J0 are listed as clear values in the transformed for loop. Further, the system can select multiple G generators of order N−1 for different tables of equal size, such matching plain text loops result in different obfuscated iteration steps.

FIG. 5 illustrates a sample clear table T1 and loop to access elements in the clear table. FIG. 6 illustrates a sample transformed table T2 and loop to access elements in the transformed table. T2 is larger (4079 elements) than T1 (256 elements) and can contain different information or elements. This size increase in FIGS. 5 and 6 is exemplary. The actual increase can be larger or smaller depending on the implementation and on various scenarios, based on the randomly generated values. In FIG. 6, the ModularMult operation can be coded apart and corresponds to ModularMult(x, y, z)=x·y modulo z. The transformed loop extracts the same information from T2 as the original loop would have extracted from table T1.

In the first variation for masking loops, J is not directly accessible because J is represented in a transformed manner. The second variation for masking loops includes modifications which enable direct access to J, or enable access to J by a formula or set of operations. In the second variation, one issue is that the code does not include J, but has access to J modulo P. If P is sufficiently large and J is relatively small, the system can recover J because J=J modulo P. Some variations allow for recovery of larger values of J. The principle of the second variation for masking loops is based on arithmetic modulo $P^2$ and other properties, outlined in the following pseudocode:

```
Select a large prime number P
N = P²
O(G) = P.(P−1) in Z/(N)
GA = G^A modulo N
GAM = G^(−A) modulo N
GS = G^S modulo N
GJ0 = GA.G^J0 modulo N
GM = GA.G^JMAX modulo N
ALPHA = ((G^(P−1) modulo N) − 1) / P
IALPHA = ALPHA^(P−2) modulo P
```

The loop for recovering J from J0 to JMAX by step S is then transformed from its clear representation

```
for (J = J0; J != JMAX; J += S)
{
    access and/or modify table T1 with J
}
``` to the obfuscated representation as shown below:

```
for (GJ = GJ0; GJ != GM; GJ = GJ.GS modulo N)
{
    // recover J modulo P like this:
    BETA = ((((GJ.GAM modulo N)^(P−1) modulo N)) − 1) / P;
    J_RECOVERED = BETA.IALPHA modulo P;
    // the recovered value of J is J_RECOVERED
}
```

Another example of an original loop and a transformed loop with actual values, used only for illustrative purposes, is provided below:

Original loop:

```
for (J = 10; J != 200; J += 2)
{
    Access or manipulate data with J
}
```

Transformed loop:

```
for (GJ = 28779; GJ != 44138; GJ = ModularMult (GJ, 49563, 51529))
{
    // read and write with J mod P to recover J as J_RECOVERED as
follow:
```

```
    unsigned long BETA = ((ModularMult(GJ, 20347, 51529), 226, 51529)) − 1) / 227;
    unsigned long J_RECOVERED = ModularMult(BETA, 216, 227);
    // J div P can be recovered, but in a more complicated fashion
}
```

The variables J, S, MAX, and J0 are masked and do not appear in clear in the transformed code. The ModularPower is a routine coding a modular exponentiation as shown below:

$$\text{ModularPower}(g,x,p) = G^X \text{ modulo } P$$

However, the ModularPower routine can also be computed recursively using the ModularMult operation as shown below:

```
RESULT = 1
for (J = 0; J < bitsize(X); J++)
{
    RESULT = ModularMult(RESULT, RESULT, P)
    If (J-th leading bit of X == 1)
    {
        RESULT = ModularMult(RESULT, G, P)
    }
}
return RESULT
```

Figure 4:
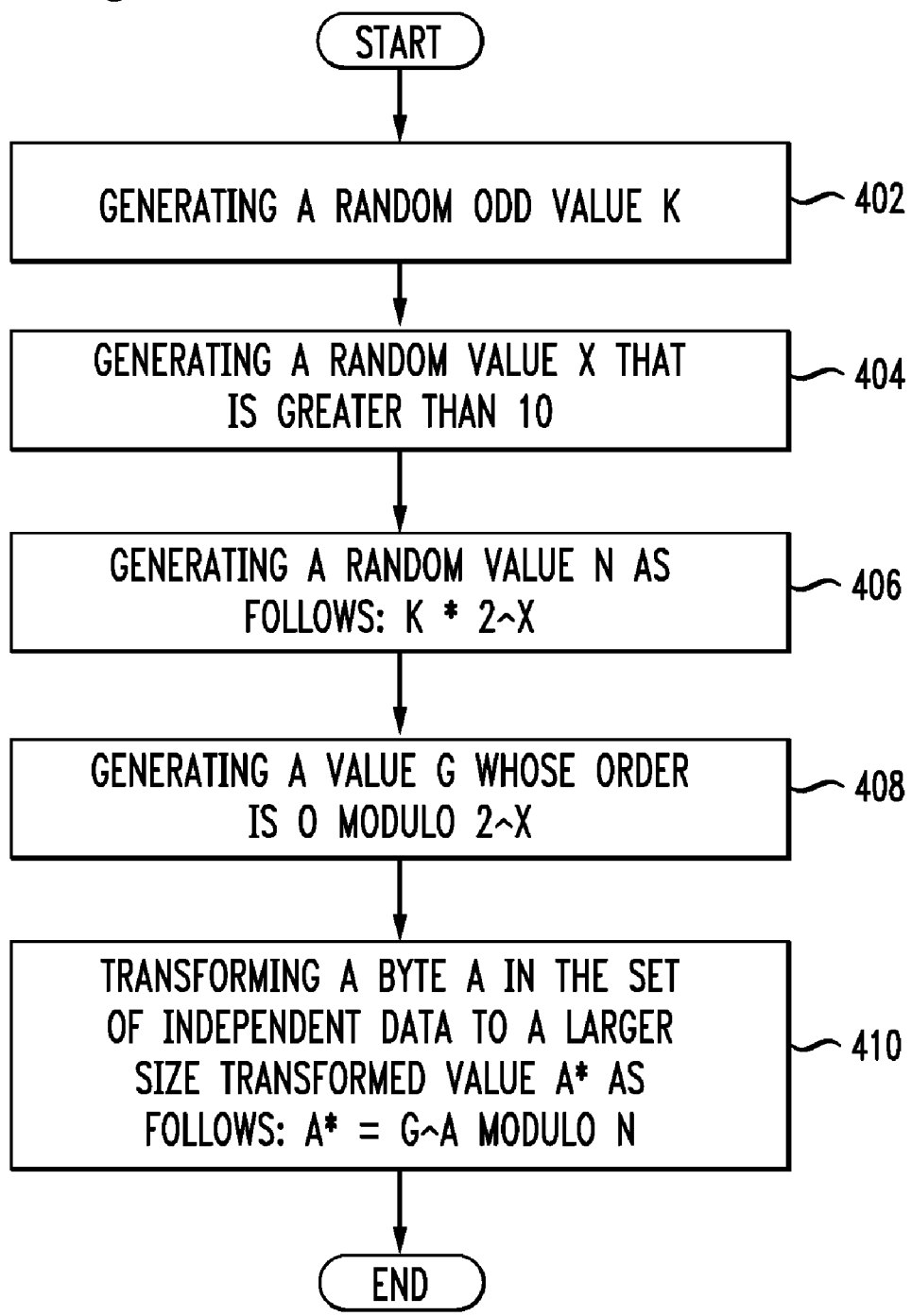
FIG. 4 illustrates another example method embodiment for masking a loop.

FIG. 4 illustrates an example method embodiment of the second variation for masking data in a process. One of the problems of working with masked or obfuscated data is that the system 100 must switch between various types of masks such that the mask on data can be changed throughout the execution of the process. Described below are various approaches to transform from one type to another. This switching mask features is useful because it is a necessary part of allowing various mask types to coexist in the code.

First, the system 100 can convert from a clear value to a DT-DL masked value, as shown in FIG. 4. In this example, assume that $O=2^8$, although this concept can easily be extended to other values. Further, a word is a 32-bit word herein unless explicitly stated differently. A system 100 configured to practice the method generates a random odd value K (402), with certain obvious limits on the bitsize. The system 100 generates a random value X that is greater than or equal to 10 (404). The system 100 generates a random value N as follows: $K*2^X$ (406). The system 100 generates a value G whose order is O modulo $2^X$ (408). The system 100 transforms a byte A in the set of independent data to a larger size transformed value A* as follows: $A^*=G^A$ modulo N (410). This process is set forth in the pseudocode below:

```
Take a random odd K
Take a random X >= 10
Take N = K * 2^X
Take G whose order is O modulo 2^X
```

Then, for any byte A, A* is a 32-bit (four byte) word transformed value computed by:

$$A^* = G^A \text{ modulo } N$$

In order to recover the clear value A from the transformed value A*, the system 100 reduces A* modulo $2^X$, or in other words computes $T=A^*$ modulo $2^X$, then uses the fact that G is of order O. The system can compute A using the discrete logarithm algorithm, which is efficient enough for small data.

In this approach, the system transforms a one byte clear value into a four byte (word) size transformed value. This approach allows for a certain entropy in that one clear value can have several transformed values because of several possible uses of K and X. Under certain circumstances, the system can transform 16 bit words into 32 bit words instead of transforming 8 bit words into 32 bit words. The system 100 can automatically determine these transformations based on security, speed, space, and/or other constraints.

In additive DT (ADD-DT) transformations, a clear value A is stored transformed in the form $A^+$, where $A^+=A+U$ and U is a random mask. To convert from ADD-DT to DT-DL, if the system 100 has an additively masked value $A^+$, the system 100 can calculate the corresponding $A^*$ by the following equation: $A^*=G^{A+}G^{-U}$ modulo N. This calculation exposes the value G, but not A or U if $G^{-U}$ is pre-computed. To convert from DT-DL to ADD-DT, with $A^*=G^A$ the system 100 can calculate $T^*=A^{**}G^U$ modulo N, and use the decrypt procedure for transforming DT-DL values to clear values to directly obtain $A^+=A+U$. In this case, neither U nor G is exposed as a clear value if $G^U$ is pre-computed.

To convert from an affine-masked value (AFF-DT) to DT-DL, if the system 100 has $A^\&=V \cdot A+U$ (where V is odd), the system 100 can compute $A^*$ by the following equation: $A^*=(G^{(A\&)}G^{(-U)})^{(V^\wedge(-1)\ modulo\ O)}$ modulo N. The symbol ^ is a symbol which raises a value to the specified power. For example, V^5 represents V raised to the power of 5, or V*V*V*V*V. In this calculation, G and V are exposed, but not A or U if $G^U$ is pre-computed. To convert from DT-DL to AFF-DT, with $A^*=G^A$, the system 100 can calculate $T^*=(A^*)^{V^\wedge-1}*G^U$, and use the decrypt procedure for converting DT-DL to clear value to directly obtain $A^\&=AV+U$. Unfortunately, in this approach, V is exposed.

The system 100 can add two transformed values without converting back to clear values using a modular addition procedure. The two transformed values must have been calculated using at least the same X and G value. If $A^*=G^A$ and $B^*=G^B$, then $C^*=A^* \cdot B^*$ is the transformed value of A+B modulo O. The system 100 can use a similar approach for modular subtraction. The system 100 can also add a transformed value and a clear value through increments of loops. If $A^*=G^A$, then $C^*=A^* \cdot G^B$ is the transformed value of A+B modulo O. The system 100 can use a similar approach for modular subtraction of a transformed value and a clear value. The system 100 can also multiply a transformed value by a clear value U. If $A^*=G^A$, then $C^*=(A^*)^U$ is the transformed value of A*U modulo O. For other operations, the system can switch to another type of masking and use the formula of this type of masking before coming back to the DT-DL value.

In one aspect, the system can use a constant for additional masking, called X-masking. For example, instead of $A^*=G^A$ modulo N, the system 100 can use $A^*=G^A*X$ modulo N, where X is a random element with X=1 modulo $2^X$, but preferably where X!=1 modulo N (e.g. $X=1+2^X$). In this manner, the value $G^A$ is not directly exposed. In another aspect, the system 100 can re-randomize DT-DL values, or in other words convert a DT-DL value to another DT-DL value. The system calculates $A^*=A^*X$ modulo N for a fresh element with X=1 modulo $2^X$, but preferably X!=1 module N (e.g. $X=1+2^X$).

In yet another aspect, the system can offset a DT-DL value. Instead of directly using the formula $A^*=G^A*X$ modulo N, the system 100 can use $A^*=G^{(A+OFFSET)}*X$ modulo N, where OFFSET is an offset dedicated to each transform. Thus, when coming back to clear values, the system 100 removes OFFSET, or when converting to DT-DL values, the system 100 inserts OFFSET as shown.

This approach provides some key benefits. For example, this approach provides a one-to-many relationship, i.e. a single clear value can have several different transformed values. A software engineer can use this attribute to avoid comparisons between two code locations that use the same clear value by implementing different transformed values which convert to the same clear value. Different transformed values arise due to re-randomization, offsetting, X-masking, and/or different values for variable parameters G, N, X. Some tradeoffs of this approach include wasted memory space when the system 100 converts a clear value to a larger DT-DL value. Further, some transforms do not allow performing all kinds of operations without making some masking type switch, which can add processor and/or memory overhead and affect performance. A programmer can include flags associated with code segments indicating a desired level of complexity, security, and/or performance that signal to a compiler which of these approaches to implement in the flagged segment.

The third variation masks pointers and/or tables using discrete logarithm principles. Obfuscation at the pointer level redirects logical addresses (i.e. where a user believes he has stored data) to physical addresses (where the program actually stores the data). In other words, the user stores a variable at index or pointer location J without knowing that in fact the computing device is storing the values unsorted at a different location at the physical level. This third variation draws a distinction between physical and logical addresses. The system 100 stores table T1 in an obfuscated table T2, with the following relationship:

T1[I] (logical address) corresponds to $T2[G^{(I+OFFSET)}$ modulo $P]$ (physical address)

Where P is prime, G is a generator of a multiplicative subgroup of integer modulo P, Q is the order of the subgroup, and OFFSET is a random index modulo Q.

In one of the usage scenarios, P is a prime and Q=P−1. One limitation of this choice of parameters is that the size S of table T1 must be smaller than or equal to the order Q. When the system 100 needs access to the I-th position of array T1, the system really accesses the position $G^{(OFFSET+I)}$ modulo P in the obfuscated array T2. As a more concrete example of this, let P=13, Q=12, and G=2 (2 is a generator of the integers modulo 13). Then the system 100 computes $2^6$ modulo 13=64 modulo 13=12 modulo 13

In this way, the $6^{th}$ "plain text" position in the table T1 is mapped to the $12^{th}$ "obfuscated" position in table T2.

Tables, arrays, and other pointer-based structures often require pointer arithmetic operations. To allow such pointer arithmetic, obfuscated tables can preserve pointer arithmetic. In one example, a programmer wants to step "forward" two positions from a pointer to the $6^{th}$ logical position in an obfuscated array to the $8^{th}$ logical position. Using normal pointer arithmetic, the programmer could accomplish this task as follows: ptr=ptr+2. However, recalling that $2^6$ mod 13=12, naïvely executing ptr+2=12+2, would cause the ptr to contain a value to a position of 14, which is invalid for the array because its size is only 13, as set forth above. The system 100 can replace this naïve pointer arithmetic with the following operation which preserves the obfuscated array:

$ptr=[(ptr-A)*(G^2)$ modulo $P]+A$ where A is the start of the array, i.e. the pointer to the first physical word of T2 (A=&T2[O]).

This formula returns the correct pointer to the value two logical steps after ptr because replacing in the formula as shown below effectively returns a logical increment of 2 in the logical array by a more complicated operation in the physical array. The system 100 can perform the below modification with minimal performance degradation.

$$\text{ptr} = [(GJ)(G^2) \text{ modulo } P] + A \text{ (expanding ptr)}$$
$$\text{ptr} = [G^{(J+2\ modulo\ Q)} \text{ modulo } P] + A$$

In this approach, the system needs to ensure that Q is greater than or equal to the size S of the table T1. The used space for the obfuscated table T2 is P words, so only a minimal amount of space goes unused for recovering T1. As mentioned before, the unused space can be used for other purposes or can be padded with filler data such as trash data, fake values, random integers, etc. to throw off an attacker. In the case where Q=P−1, the wasted space is very minimal. When Q is much smaller than P, a negligible part of the table T2 contains "real" words that correspond to the untransformed table T1. As in the other two variations, the system can fasten the computation of GJ modulo P using one or more of several techniques, including pre-computed tables of data, K-ary exponentiation methods, etc., which one of skill in the art will know and appreciate how to implement.

Any or all of the steps and/or modules can be integrated with or interact with a compiler. FIG. 7 illustrates a block diagram of an exemplary compiler 700. The modules and elements of the exemplary compiler 700 can be modified and/or added to in order to implement the discrete logarithm data transform principles disclosed above. A compiler 700 converts human-readable source code 702 to object code or machine code 712 which is understandable to and typically executable by a computing device 100. In one aspect, the source code 702 represents object code or machine code that has the obfuscation steps applied to generate modified object or machine code 712. A compiler 700 typically performs the following representative operations as well as other operations: lexical analysis 704, preprocessing, parsing 706, semantic analysis 706, code optimization 708, and code generation 710. Compilers allow programmers to write software using high level languages and convert those high level instructions to binary machine code 712.

The compiler 700 takes as input source code 702 for a computer program written in a programming language like Perl, Objective-C, Java, etc. The compiler 700 passes the code to the front end of the compiler 700 which includes the lexical analyzer 704 and the semantic analyzer or parser 706. At this stage or at any other stage in the compiler 700, a module shown or not shown can perform all or part of the steps outlined above. The compiler 700 then operates on the source 702 in the back end, which includes the code optimizer 708 and the code generator 710. Often the division between the front end and the back end of a compiler is somewhat blurred. The compiler 700 can include other modules and can appear in different configurations. Other possible front end components include a preprocessing module and a semantic analysis module. The front end produces an intermediate representation of the code which is passed to the back end of the compiler 700. The back end of a compiler 700 can include an optimizer 708 and a code generator 710. Finally, the code generator 710 produces machine code 712 or object code. A linker, not shown, can combine the output 712 from several related compiled projects into a single executable file. An obfuscation tool separate from the compiler 700 can process the machine code 712 according to all or part of the steps outlined above to produce modified or obfuscated machine code. Likewise, an obfuscation tool can operate on source code 702 to produce modified or obfuscated source code which is passed to a regular, unmodified compiler 700. In one aspect, a module in the compiler, a pre-processing tool, and/or a post-processing tool operating together perform the overall task of obfuscation based on discrete logarithm data transforms. Other compiler components and modules can be added within the spirit and scope of this disclosure.

Embodiments within the scope of the present disclosure may also include computer-readable storage media for carrying or having computer-executable instructions or data structures stored thereon. Such computer-readable storage media can be any available media that can be accessed by a general purpose or special purpose computer, including the functional design of any special purpose processor as discussed above. By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. The techniques and approaches disclosed herein are not exclusive to existing obfuscation techniques and can be combined with other obfuscation approaches. Those skilled in the art will readily recognize various modifications and changes that may be made to the principles described herein without following the example embodiments and applications illustrated and described herein, and without departing from the spirit and scope of the disclosure.

We claim:

1. A method of obfuscating data based on a discrete logarithm, the method causing a computing device to perform steps comprising:
    identifying, via the computing device, a first clear value in source code;
    replacing, via the computing device, the first clear value in the source code with a first transformed value, the first transformed value generated based on the first clear value and a discrete logarithm, wherein the first clear value is a set of independent data and generating the first transformed value includes steps comprising:
        generating a random odd value K,
        generating a random value X that is greater than 10,
        generating a random value N as follows: $K*2^X$,
        generating a value G whose order is O modulo $2^X$, and
        transforming a byte A in the set of independent data to a larger size transformed value $A^*$ as follows: $A^* = G^A$ modulo N; and
    updating, via the computing device, portions of the source code that refer to the first clear value such that interactions with the first transformed value provide a same result as interactions with the first clear value.

2. The method of claim 1, further causing the computing device to perform steps comprising:
    identifying a second clear value in source code;
    replacing the second clear value in the source code with a second transformed value, the second transformed value generated based on the second clear value and a discrete logarithm, wherein the second clear value is part of a loop having an initializer statement which initializes a value J to a value J0, a loop-test statement comparing J to a maximum value JMAX, and a counting expression statement which increments J by a value S, wherein a body of the loop references indices in a table T1, and wherein generating the second transformed value includes steps comprising:
        generating a random value N,
        generating a random value G whose order is O in $Z_N^*$,
        generating a random value A,
        calculating a value GA as follows: $G^A$ modulo N,
        calculating a value GM as follows: $GA*G^{JMAX}$ modulo N,
        calculating a value GJ0 as follows: $GA*G^{J0}$ modulo N,
        calculating a value GS as follows: $G^S$ modulo N,
        generating a new table T2 based on table T1 and values GA, GM, GJ0, GS, J0, JMAX, and S, and
        in the loop, replacing the initializer statement J=J0 with G=GJ0, replacing the loop test statement J!=JMAX with G!=GM, replacing the counting expression statement J+=S with G=G*GS modulo N, and replacing the table T1 with the new table T2; and
    updating portions of the source code that refer to the second clear value such that interactions with the second transformed value provide a same result as interactions with the second clear value.

3. The method of claim 2, wherein the loop is a for loop.

4. The method of claim 2, wherein JMAX−J0 is less than the order O.

5. The method of claim 2, wherein the replaced loop extracts the same information from table T2 as the original loop would have extracted from table T1.

6. The method of claim 2, wherein table T2 is larger than table T1 and contains different information than is found in T1.

7. A system for obfuscating data based on a discrete logarithm, the system comprising:
    a processor;
    a module configured to control the processor to identify a clear value in source code;
    a module configured to control the processor to replace the clear value in the source code with a transformed value, the transformed value generated based on the clear value and a discrete logarithm, wherein the clear value is a set of independent data and the generating includes steps comprising:
        generating a random odd value K,
        generating a random value X that is greater than 10,
        generating a random value N as follows: $K*2^X$,
        generating a value G whose order is O modulo $2^X$, and
        transforming a byte A in the set of independent data to a larger size transformed value $A^*$ as follows: $A^* = G^A$ modulo N; and
    a module configured to control the processor to update portions of the source code that refer to the clear value such that interactions with the transformed value provide a same result as interactions with the clear value.

8. The system of claim 7, wherein one clear value can have several transformed values.

9. The system of claim 7, further comprising a module that controls the processor to perform a mathematical operation on the transformed value without exposing the clear value.

10. The system of claim 9, wherein the mathematical operation is addition, and wherein the module that controls the processor to perform the mathematical operation performs addition of an additively masked value $A^+$ calculated based on A+U by calculating $G^{(A^+)}*G^{(-U)}$ modulo N.

11. A non-transitory computer-readable storage medium storing a computer program for controlling a computing device to perform certain steps, the computer program having embedded obfuscated data based on a discrete logarithm, the embedded data created by steps comprising:
    identifying a clear value in source code;
    replacing the clear value in the source code with a transformed value, the transformed value generated based on the clear value and a discrete logarithm, wherein the clear value is a set of independent data and the generating includes steps comprising:
        generating a random odd value K,
        generating a random value X that is greater than 10,
        generating a random value N as follows: $K*2^X$,
        generating a value G whose order is O modulo $2^X$, and
        transforming a byte A in the set of independent data to a larger size transformed value $A^*$ as follows: $A^* = G^A$ modulo N; and
    updating portions of the source code that refer to the clear value such that interactions with the transformed value provide the same result as interactions with the clear value.

12. The non-transitory computer-readable storage medium of claim 11, wherein the clear value is a set of pointers and the transformed value is a set of transformed pointers.

13. The non-transitory computer-readable storage medium of claim 12, wherein the set of pointers is sorted, and wherein the set of transformed pointers is unsorted.

14. The non-transitory computer-readable storage medium of claim 11, wherein the clear value-th element of a table T1 is equivalent to element (G^(clear value+offset) modulo P) in a table T2, where P is an integer, G is a generator of a multiplicative subgroup of integer modulo P, Q is the order of the subgroup, and offset is a random index modulo Q.

15. The non-transitory computer-readable storage medium of claim 14, wherein P is a prime and Q is P minus 1.

16. The non-transitory computer-readable storage medium of claim 14, wherein a size of table T1 is smaller than or equal to an order Q.

17. A computing device including a processor, the processor executing instructions which include data obfuscated based on a discrete logarithm, the data being obfuscated by steps comprising:
   identifying a clear value in a set of computer instructions;
   replacing the clear value in the set of computer instructions with a transformed value, the transformed value based on the clear value and a discrete logarithm, wherein the clear value is part of a loop having an initializer statement which initializes a value J to a value J0, a loop-test statement comparing J to a maximum value MAX, and a counting expression statement which increments J by a value S, wherein a body of the loop references indices in a table T1, wherein the generating includes steps comprising:
      generating a random value N,
      generating a random value G whose order is O in $Z_N^*$,
      generating a random value A,
      calculating a value GA as follows: G^A modulo N,
      calculating a value GM as follows: GA*G^JMAX modulo N,
      calculating a value GJ0 as follows: GA*G^J0 modulo N,
      calculating a value GS as follows: G^S modulo N,
      generating a new table T2 based on table T1 and values GA, GM, GJ0, GS, J0, JMAX, and S, and
      in the loop, replacing the initializer statement J=J0 with G=GJ0, replacing the loop test statement J!=JMAX with G!=GM, replacing the counting expression statement J+=S with G=G*GS modulo N, and replacing the table T1 with the new table T2; and
   updating portions of the set of computer instructions that refer to the clear value such that interactions with the transformed value provide a same result as interactions with the clear value; and
   compiling, via the processor, the computer instructions into a computing-device readable executable format.

18. The computing device of claim 17, wherein the clear value is a set of pointers and the transformed value is a set of transformed pointers.

19. The computing device of claim 17, wherein the set of pointers is sorted, and wherein the set of transformed pointers is unsorted.

20. The computing device of claim 17, wherein the clear value-th element of a table T1 is equivalent to element (G^(clear value+offset) modulo P) in a table T2, where P is an integer, G is a generator of a multiplicative subgroup of integer modulo P, Q is the order of the subgroup, and offset is a random index modulo Q.

* * * * *